United States Patent [19]
Rivett et al.

[11] Patent Number: 5,755,081
[45] Date of Patent: May 26, 1998

[54] HEAT-SEALABLE, MULTILAYER FILM CONTAINING THEREIN A COLORANT AND METHOD FOR MAKING A PACKAGE WITH SUCH FILM

[75] Inventors: Janet W. Rivett, Simpsonville; Blake L. Westmoreland, Woodruff, both of S.C.

[73] Assignee: W. R. Grace & Co.-Conn., Duncan, S.C.

[21] Appl. No.: 792,202

[22] Filed: Jan. 31, 1997

[51] Int. Cl.⁶ .................................. B65B 51/10
[52] U.S. Cl. .................. 53/477; 53/375.9; 428/204; 428/207
[58] Field of Search .................. 156/243, 246, 156/301; 53/520, 477, 373.7, 375.9, 411; 428/203, 204, 206, 207

[56] References Cited

U.S. PATENT DOCUMENTS

| | | | |
|---|---|---|---|
| 3,575,755 | 4/1971 | Cutler et al. | 53/411 |
| 4,229,241 | 10/1980 | Mueller | 156/243 |
| 4,234,643 | 11/1980 | Grotefend et al. | 428/204 |
| 4,502,263 | 3/1985 | Crass et al. | 53/396 |
| 4,547,427 | 10/1985 | Engelsberger | 428/349 |
| 4,595,625 | 6/1986 | Crass et al. | 428/215 |
| 4,678,528 | 7/1987 | Smith et al. | 156/246 |
| 4,909,881 | 3/1990 | Garland | 156/243 |
| 5,219,638 | 6/1993 | Imamura et al. | 428/204 |
| 5,397,636 | 3/1995 | Miyao et al. | 156/243 |

*Primary Examiner*—James F. Coan
*Assistant Examiner*—Gene L. Kim
*Attorney, Agent, or Firm*—Thomas C. Lagaly

[57] ABSTRACT

A multilayer film includes:
- a. a first layer comprising a material having a melting point of at least 145° C.;
- b. a second layer comprising a colorant blended with a polymer having a vicat softening point ranging from 100° C. to 140° C.;
- c. a third layer comprising a material having a melting point of at least 135° C.; and
- d. a fourth layer comprising a material which is capable of forming a heat-seal, wherein, the second layer is positioned between the first and third layers and the fourth layer is an exterior layer.

21 Claims, 1 Drawing Sheet

HEAT-SEALABLE, MULTILAYER FILM CONTAINING THEREIN A COLORANT AND METHOD FOR MAKING A PACKAGE WITH SUCH FILM

BACKGROUND OF THE INVENTION

The present invention relates to packaging materials of a type employing flexible, polymeric films having a colorant therein. More specifically, the invention pertains to colorant-containing films which are heat-sealed to itself, another film, or other package component to thereby enclose a product therewithin.

Packages for products are often formed by first thermoforming a polymeric film or foamed sheet into a desired shape for containment of a product therein, positioning the product within the thermoformed container, placing a polymeric film over the thermoformed container, and then heat-sealing the film and container together in such a manner that the product is enclosed between the film and container. Packages may also be produced by forming a polymeric film into a pouch, heat-sealing closed all but one of the open edges thereof, filling the pouch with a product via the open edge, and then heat-sealing closed the remaining open edge to enclose the product. Both of the foregoing processes for producing a package are well known in the art of packaging.

As is also well known, a "heat-seal" refers to the union of two films, e.g., a film and a thermoformed film/container or two portions of the same film, by bringing the films into contact with one another and then applying sufficient heat and pressure to the contacting regions of the films to cause the films to fuse together. Conventionally, the heat-seal is continuous and encircles the product to completely enclose the product within the two films, and is formed by a mechanism that includes a heated element (often referred to as a "seal-head") which is pressed onto the contacting regions of the films from one side of one of the films and typically presses the films against a non-heated backing element so that the films are pressed between the heated element and backing element for a period of time sufficient to effect a heat-seal.

A problem often occurs when one or both of the films from which the package is formed contains therein a colorant, e.g., a pigment, so that the film is not clear but is, instead, opaque in the color of the colorant. This is often done for a variety of reasons, e.g., to provide a more aesthetically appealing package or to provide a background which enhances the appearance or readability of a product label or other indicia that is placed upon the package. The colorant is typically blended with the polymer(s) from which the film is formed. If the film is a multilayer film, then the colorant is blended with one or more layers of the film, i.e., with the polymer(s) which forms such film layers. When the colorant-containing film is exposed to heat and pressure during the formation of a heat-seal, the colorant can be hydraulically redistributed, i.e., pushed aside, by the force of the heat-seal mechanism so that non-colored (i.e., clear) blotches and/or streaks appear on the otherwise colored film. As can be readily appreciated, such blotches and/or streaks have an adverse impact on the aesthetic qualities of the package. Hydraulic redistribution is believed to occur when the polymer with which the colorant is blended becomes sufficiently soft during heat-sealing that the force of the heat-seal mechanism causes the colorant to be displaced in certain areas.

In addition to hydraulic redistribution of colorant, another adverse effect which can occur during heat-sealing is the distortion, e.g., narrowing in width, of one or both films which are to be heat-sealed together.

Both hydraulic redistribution and distortion are believed to result when a film has insufficient temperature stability at the heat-seal temperature. To overcome these problems, either the heat-seal temperature must be lowered or the temperature stability of the film must be increased. Lowering the heat-seal temperature is not preferred because this can result in weakened or incompletely formed heat-seals. A number of factors can affect the integrity of a heat-seal, including the thickness and structure of the film, the material from which the heat-seal layer (i.e., the layer which actually forms the heat-seal) is constructed, the operating condition of the heat-seal mechanism (e.g., the uniformity of the applied temperature and pressure, the physical condition of the surfaces which come into contact with the film, etc.), the presence of contaminates (e.g., food or other products to be packaged) in the heat-seal areas of the film, etc. In general, raising the heat-seal temperature can effectively overcome many heat-seal deficiencies which may be caused by one or more of the foregoing factors, provided that the film (or films) which is subjected to the heat-seal operation can withstand the increased temperature. Thus, it is highly advantageous for packaging films be able to withstand the highest possible heat-seal temperatures because this increases the liklihood that a good heat-seal can be formed in a wide variety of heat-seal conditions.

Increasing the temperature stability of a film to be used in heat-sealing operations, then, is the most propitious means of overcoming the problems of heat-distortion and hydraulic redistribution during heat-sealing. While heat-distortion can be reduced by including in the film polymers having a relatively high melting point, such as a polyamide or a polypropylene, such high melting point polymers tend to be more expensive and more difficult to process in a coextruded film than polymers having a relatively low melting point such as polyethylene homopolymers and copolymers. Similarly, although it is possible to minimize hydraulic redistribution by blending colorant with a relatively high melting point polymer (e.g., polyamide or polypropylene), in most instances this results in a film which is more expensive and more difficult to process than a film in which the colorant is blended with a relatively lower melting point polymer, such as a polyethylene homopolymer or copolymer.

Accordingly, there is a need in the art for a colorant-containing polymeric film which provides temperature stability and minimum hydraulic redistribution during heat-sealing, but with a color-carrying layer formed from a relatively low melting point (or low vicat softening point) polymer and with a minimum amount of relatively high melting point polymer. By having a minimum amount of high melting point polymer, such a film would be both cost-effective and easier to process in comparison with films having greater amounts of relatively high melting point polymer.

SUMMARY OF THE INVENTION

That need is met by the present invention which provides a multilayer film, comprising:
  a. a first layer comprising a material having a melting point of at least 145° C.;
  b. a second layer comprising a colorant blended with a polymer having a vicat softening point ranging from 100° C. to 140° C.;
  c. a third layer comprising a material having a melting point of at least 135° C.; and d. a fourth layer comprising a material which is capable of forming a heat-seal, wherein, the second layer is positioned between the first and third layers and the fourth layer is an exterior layer.

The invention also provides a package and method for making a package comprising the steps of providing a multilayer film as described above and heat-sealing the multilayer film upon itself or to another film (e.g., a thermoformed foamed or non-foamed film) to form an enclosed package for food products such as, e.g., meats (hot-dogs, luncheon meats, etc.), cheeses, vegetables, pumpable or flowable foods, etc., or non-food products such as, e.g., print cartridges, baby wipes, medical devices, etc.

The second, color-containing layer comprises a polymer having a vicat softening point ranging from 100° C. to 140° C. Polymers falling within such vicat softening point range generally include relatively lower melting point (and therefore lower cost, easily processable) polymers such as, e.g., medium or high density polyethylenes or polystyrenes. Unlike melting point, vicat softening point takes into account both temperature and pressure as applied to a material (melting point only involves temperature), and thus vicat softening point is a more accurate means for describing color-carrying polymers which resist hydraulic redistribution and heat-distortion when heat and pressure are applied during heat-sealing. Color-carrying polymers having vicat softening points falling within the range set forth above have been found to provide beneficial resistance to heat-distortion and hydraulic redistribution of the colorant throughout a wide range of commercially usable heat-seal conditions (temperatures ranging from about 90° C. to about 180° C. and pressures ranging from about 20 psi to about 120 psi) when employed in a multilayer film in accordance with the present invention (i.e., when positioned between the relatively high melting point first and third layers as set forth above).

DEFINITIONS

As used herein, the term "multilayer film" refers to a thermoplastic material, generally in sheet or web form, having one or more layers formed from polymeric or other materials which are bonded together by any conventional or suitable method, including one or more of the following methods: coextrusion, extrusion coating, lamination, vapor deposition coating, solvent coating, emulsion coating, or suspension coating.

As used herein, the terms "coextrusion," "coextrude," and the like refer to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the term "layer" refers to a discrete film component which is coextensive with the film and has a substantially uniform composition.

As used herein, the phrase "interior layer" refers to any layer of a multilayer film having both of its principal surfaces directly adhered to another layer of the film.

As used herein, the phrase "exterior layer" refers to any layer of a multilayer film having only one of its principal surfaces directly adhered to another layer of that film. In a multilayer film, there are two exterior layers, each of which has a principal surface adhered to only one other layer of the film. The other principal surface of each of the two exterior layers forms the two principal outer surfaces of the film.

As used herein, the phrase "melting point" refers generally to the temperature at which a material transitions from solid to liquid.

As used herein, the phrase "vicat softening point" refers to the temperature at which a flat-ended needle of 1 mm$^2$ circular cross section will penetrate a thermoplastic specimen to a depth of 1 mm (±0.01 mm) under a load of 10 Newtons (±0.2 Newtons) and a rate of temperature rise of 50° C./hour (±5° C./hour), as specified in ASTM D 1525-95 (Rate A, Loading 1).

As used herein, the term "heat-seal" refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool.

As used herein, the phrase "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow).

The phrase "ethylene/alpha-olefin copolymer" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ and ENGAGE™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, VLDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such single-site catalysts typically have only one type of catalytic site, which is believed to be the basis for the homgeniety of the polymers resulting from the polymerization.

DETAILED DESCRIPTION OF THE INVENTION

Figure 1:
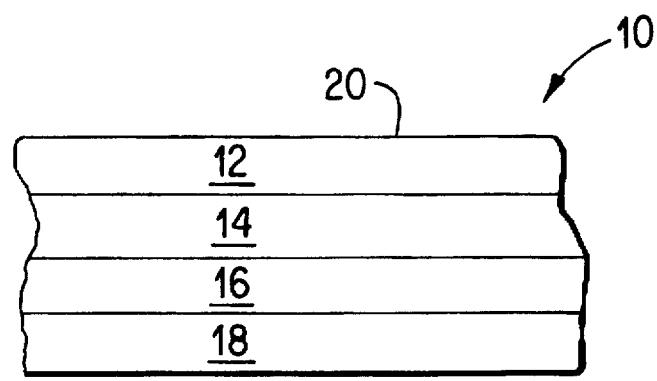
FIG. 1 is a cross-sectional view of a multilayer film in accordance with the present invention.

FIG. 1 illustrates a multilayer film 10 in accordance with the present invention. First layer 12 is preferably an exterior, heat-resistant layer comprising a material having a melting point of at least 145° C. Second layer 14 is preferably an interior, color-carrying layer comprising a colorant blended with a polymer having a vicat softening point ranging from 100° C. to 140° C. Third layer 16 is preferably an interior, heat-resistant layer comprising a material having a melting point of at least 135° C. Fourth layer 18 is preferably an exterior, heat-seal layer comprising a material which is capable of forming a heat-seal. As shown, second layer 14 is positioned between first layer 12 and third layer 16. As will now be explained, this combination and arrangement of film layers has unexpectedly been found to result in a heat-sealable, color-containing film which resists both heat-distortion and hydraulic redistribution of the colorant in the second layer during heat-sealing.

In its intended use, multilayer film 10 is heat-sealed to itself, another film, or a thermoformed container to form a package by bringing heat-seal layer 18 into contact with itself or with the corresponding heat-seal layer of another film or container and then applying heat and pressure in the direction shown by the arrow in FIG. 1 to the outer surface 20 of first layer 12. The heat and pressure is sufficient to cause fourth layer 18 and the heat-seal layer with which it is in contact (i.e., itself or a heat-seal layer from another film or container) to fuse (bond) together. Second layer 14 is formed from a relatively low-cost, easily processed material such as polyethylene or polystyrene (or other such material having a vicat softening point ranging from 100° C. to 140° C.), and is generally a relatively thick layer in the film in order to carry enough colorant to provide sufficient opacity to the film (at least about 50%, more preferably at least 60%, and most preferably at least 70%). While providing multilayer film 10 with the advantages of low cost and ease of processing, second layer 14 would conventionally be expected to impart to multilayer film 10 the deleterious effects of heat-distortion and hydraulic redistribution of the colorant. However, it has been found that these effects are avoided in accordance with the present invention when second layer 14 is positioned between the higher melting point first and third layers 12 and 16, respectively. First layer 12 protects second layer 14 from being melted due to direct contact with the heat-seal mechanism. For reasons which are not fully understood, third layer 16 has been found to prevent the colorant in second layer 14 from being hydraulically redistributed during heat-sealing. That is, although first layer 12, having a melting point of at least 145° C., prevents color-carrying layer 14 from melting during heat-sealing, this alone is insufficient to prevent the colorant in layer 14 from being redistributed (thereby forming unsightly blotches and streaks) during heat-sealing. This is demonstrated in Comparative Example 1, in which a layer having a melting point of at least 135° C. was not positioned between the color-carrying layer and the heat-seal layer, thereby resulting in hydraulic redistribution of the colorant at a heat-seal temperature of only 130° C. as noted in Example 2. In contrast, Example 1 demonstrates that the placement of a layer of EVOH, having melting point of approximately 172° C., as an interior, heat-resistant layer between the color-carrying layer and the heat-seal layer results in no heat-distortion or redistribution of the colorant at heat-seal temperatures of up to at least 175° C.

Also important to the ability of the inventive films to resist heat-distortion and hydraulic redistribution is that the color-carrying layer 14 have a minimum vicat softening point of at least 100° C. The importance of this is demonstrated in Comparative Example 2 in which low density polyethylene (LDPE), having a vicat softening point of approximately 92° C., was employed as the color-carrying polymer. Although PET and EVOH were used as exterior and interior heat-resistant layers, respectively (having respective melting points of 255° C. and 172° C.), the multilayer film of Comparative Example 2 exhibited heat-distortion and hydraulic redistribution at a heat-seal temperature of only 140° C. The film of Example 1, on the other hand, had high density polyethylene as a color-carrying layer (vicat softening temperature of approximately 130° C.) and exhibited no heat-distortion or hydraulic redistribution up to a heat-seal temperature of at least 175° C.

As noted above, first layer 12 comprises a material having a melting point of at least 145° C. More preferably, such material has a melting point of at least 150° C. and, more preferably, at least 155° C. Third layer 16 comprises a material having a melting point of at least 135° C., preferably at least 140° C. and, more preferably, at least 155° C. Suitable materials for first and third layers 12 and 16 include polyester, copolyester, polyamide, copolyamide, polypropylene, polymethylpentene, polycarbonate, ethylene vinyl alcohol copolymer, and mixtures and copolymers of the foregoing materials. A preferred material for first layer 12 is PET while a preferred material for third layer 16 is EVOH (EVOH advantageously provides both heat-resistance and oxygen-barrier functionality).

Second layer 14 comprises a polymer having a vicat softening point ranging from 100° C. to 140° C. Although polymers having a vicat softening point greater than 140° C. would likely be operable, such polymers include higher melting point polymers such as polypropylenes and polyamides which, as stated above, tend to be more expensive and more difficult to process than polymers having lower vicat softening points (and lower melting points) such as polyethylenes and polystyrenes. As demonstrated in the Examples and noted above, polymers having a lower vicat softening point produce multilayer films having too low of a maximum heat-seal temperature before heat-distortion and hydraulic redistribution occur. A more preferred vicat softening point temperature range is 105° C. to 135° C. and, more preferably, 110° C. to 135° C. Suitable polymers for second layer 14 include linear low density polyethylene, medium density polyethylene, high density polyethylene, polystyrene, and mixtures of the foregoing materials. A preferred polymer is high density polyethylene. If desired, a polymer having vicat softening point less than 100° C. can be used, provided the vicat softening point of such polymer can increased to 100° C. or greater by cross-linking.

Suitable colorants include pigments and dyes, particularly those which are incorporated in a color concentrate, i.e., a compounded (thermally and mechanically produced) blend of a resin and generally a high percentage of either pigment or dye. The color concentrate is later diluted during coextrusion by mixing the concentrate with the primary resin (i.e., one of the polymers listed above as suitable for second layer 14). Preferably, the resin portion of the color concentrate is compatible with the primary resin used in second layer 14.

Fourth, heat-seal layer 18 may comprise any material which is capable of forming a heat-seal with itself or another heat-seal material. Preferred examples include ionomer, ethylene/alpha-olefin copolymer, ethylene/vinyl acetate copolymer, ethylene/methyl acrylate copolymer, ethylene/propylene copolymer, polybutylene homopolymer or copolymer, and mixtures of the foregoing materials.

Layers 12, 14, 16, and 18 may have any desired thickness, ranging from about 0.05 mils to about 3 mils (1 mil=0.001 inch) each. Preferably, layers 12 and 16, formed from relatively high melting point and generally expensive polymers, are relatively thin in comparison to layers 14 and 18 which can be formed from less expensive, lower melting point polymers. First layer 12 preferably has a thickness ranging from 0.25 mil to 1 mil, more preferably from 0.35 mil to about 0.75 mil and, most preferably, from about 0.40 mil to about 0.60 mil. Second layer 14 preferably has a thickness ranging from 0.2 mil to 1.2 mil, more preferably from 0.3 mil to about 1 mil and, most preferably, from about 0.5 mil to about 0.8 mil. Third layer 16 preferably has a thickness ranging from 0.05 mil to 1 mil, more preferably from 0.1 mil to about 0.75 mil and, most preferably, from about 0.15 mil to about 0.5 mil. Fourth layer 18 preferably has a thickness ranging from 0.15 mil to 3 mils, more preferably from 0.2 mil to about 1.5 mils and, most preferably, from about 0.25 mil to about 0.6 mil.

Preferably, the amount of polymer having a melting point of at least 135° C. is no greater than about 50% of the total thickness of multilayer film 10. More preferably, polymer having a melting point of at least 135° C. comprises between 18 to 50 percent of the total thickness of multilayer film 10 and, even more preferably, between 20 and 35%.

Additional layers can be added to multilayer film 10 as necessary or desired. For example, tie or adhesive layers may be included in order to bond some or all of the layers together. Layers providing oxygen-barrier functionality formed from, e.g., ethylene/vinyl alcohol copolymer, polyamide or copolyamide, polyvinylidene copolymers, etc., may also be included in multilayer film 10 if desired.

Various additives may used in any or all of the layers of the multilayer film of the present invention. Such additives include, without limitation, antiblocking agents, antioxidants, processing aids such as calcium stearate, pigments, antistatic agents, etc.

In a preferred embodiment of the present invention, multilayer film 10 comprises a laminated structure in which first layer 12 is laminated to a coextruded film comprising second, third, and fourth layers 14–18. First layer 12 may be bonded to the coextruded film (comprising layers 14–18) by any suitable means, including adhesive bonding; reactive surface modification (e.g., corona treatment, flame treatment, or plasma treatment); heat treatment; pressure treatment; etc., including combinations thereof. The coextruded film may be formed by any suitable coextrusion method, including hot-blown and cast coextrusion, preferably as a tubular film. A particularly preferred embodiment of the invention is illustrated in Example 1 below, wherein PET is employed as the exterior, heat-resistant layer and is adhesively laminated to a five-layer, coextruded film having HDPE as the interior, color-carrying layer; EVOH as the interior, heat-resistant layer; and ionomer as the exterior, heat-seal layer.

Multilayer films in accordance with the present invention may be cross-linked if desired, e.g., to increase the structural strength of the film at elevated temperatures and/or to increase the force at which the material can be stretched before tearing apart. Cross-linking is preferably done by irradiation, i.e., bombarding the film with particulate or non-particulate radiation such as high-energy electrons from an accelerator or cobalt-60 gamma rays. Any conventional cross-linking technique may be used. For example, electronic cross-linking may be carried out by curtain-beam irradiation. Chemical cross-linking techniques may also be employed, e.g., by the use of peroxides.

The multilayer films of the present invention may be used in any packaging application in which a colored film is desired. For example, the films may be peripherally heat-sealed to a thermoformed container which contains therein a product to be packaged. The container may be pre-thermoformed by any thermoforming technique well known in the art, loaded with product, and then heat-sealed to the multilayer film of the present invention about the periphery of the resultant package to enclose the product. Alternatively, in accordance with well-known vacuum skin packaging techniques, the container may be thermoformed using the product to be packaged as the thermoforming mold and then heat-sealed to the multilayer film of the present invention (see, e.g., U.S. Pat. No. 3,694,991 (Purdue et al.) for a description of vacuum skin packaging).

Another example of a packaging application in which the multilayer films of the present invention may find use is vertical or horizontal form/fill/seal (FFS) packaging. An example of such a system is the Onpack 2000 B (™) pumpable food packaging system sold by W. R. Grace & Co.-Conn. through its Grace Packaging (Cryovac) group. The FFS process is known to those of skill in the art, and described for example in U.S. Pat. No. 4,589,247 (Tsuruta et al). In the case of vertical FFS packaging, a flowable or pumpable product is introduced through a central, vertical fill tube to a formed tubular multilayer film of the present invention, the tube having been sealed transversely at its lower end and longitudinally to form a pouch for containment of the product. The pouch is then completed by sealing the upper end of the tubular segment, and severing the pouch from the tubular film above it.

The invention will now be further described in the following examples.

EXAMPLES

The materials used in the examples are identified below:
1. "ADH": A polyurethane adhesive.
2. "CC-PE": AMPACET (™) 110069; a color concentrate utilizing a low density polyethylene carrier resin with 70% titanium dioxide as a white colorant; obtained from Ampacet of Tarrytown, N.Y. (The LDPE carrier resin has a density of 0.918 g/cc and a melt index of 2.3 g/min.(ASTM D-1238).)
3. "CC-PP": STANDRIDGE (™) 10337; a color concentrate utilizing a polypropylene carrier resin with 50% titanium dioxide as a white colorant; obtained from Standridge Color Corporation in Social Circle, Ga.
4. "CC-N": STANDRIDGE (™) 17863; a color concentrate utilizing a nylon carrier resin with 48% titanium dioxide as a white colorant; obtained from Standridge Color Corporation in Social Circle, Ga.
5. "EAO1": EXACT 3027(™); a homogeneous ethylene/butene copolymer having a density of 0.90 g/cc (ASTM D-792) and a melt index of 3.5 g/min. (ASTM-1238); obtained from the Exxon Chemical Company of Baytown, Tex.

6. "EAO2": AFFINITY (™) PF1140; a homogeneous ethylene/octene-1 copolymer having 14% octene, a density of 0.8965 g/cc (ASTM D-792), and a melt index of 1.6 g/min. (ASTM D-1238); obtained from the Dow Chemical Company of Midland, Mich.

7. "EVOH": SOARNOL (™) ET; an ethylene/vinyl copolymer having 38% ethylene, a density of 1.17 g/cc, a melting point of approximately 185° C., and a melt index of about 2.8; obtained from Nippon Goshei.

8. "HDPE": ALATHON (™) M6020; a high density polyethylene homopolymer having a density of 0.957 g/cc (ASTM D-792), a vicat softening point of approximately 130° C. (ASTM D 1525-95), and a melt flow index of 2.0 g/min. (ASTM D-1238); obtained from Lyondell Polymers of Houston, Tex.

9. "ION 1": SURLYN (™) 1650; a zinc salt ionomer of ethylene/methacrylic acid copolymer with a melt flow index of 1.6 g/min. (ASTM D-1238) and a density of 0.950 g/cc (ASTM D-792); obtained from DuPont of Wilmington, Del.

10. "ION2": SURLYN (™) 1705; a zinc salt ionomer of ethylene/methacrylic acid copolymer with a melt flow index of 5.5 g/min. (ASTM D-1238) and a density of 0.960 g/cc (ASTM D-792); obtained from DuPont of Wilmington, Del.

11. "LDPE": REXENE PE1042CS15; a low density polyethylene with a melt flow index of 2.0 (ASTM D-1238), a vicat softening point of approximately 93° C. (ASTM D 1525-95), and a density of 0.922 g/min. (ASTM D-792); obtained from Rexene of Dallas, Tex.

12. "N6": ULTRAMID (™) KR-4407F; a polyamide 6 resin with a viscosity number of 195 cm3/g (ISO 307), a melting point of approximately 250° C., and a density of 1.13 g/cc; obtained from BASF of Wyandotte, Mich.

13. "PET-1": MELINEX (™) 800; a polyethylene terephthalate film having a thickness of 0.48 mil; obtained from ICI Films of Hopewell, Va.

14. "PET-2": 50M-44 MYLAR (™); a saran-coated polyethylene terephthalate film having a thickness of 0.56 mil; obtained from DuPont of Wilmington, Del.

15. "PP": ESCORENE (™) PD9302; a propylene homopolymer having a density of about 0.90 g/cc (ASTM D1505), a vicat softening point of approximately 155° C., a melting point of approximately 165° C., and a melt flow index of 3.8 g/min. (ASTM D-1238); obtained from the Exxon Chemical Company of Baytown, Tex.

16. "TIE-1": PLEXAR (™) 107; an anhydride-grafted polyolefin in ethylene/vinyl acetate having a melt index of 3.2 g/min. (ASTM D-1238); obtained from Quantum Chemicals of Cincinnati, Ohio.

17. "TIE-2": PLEXAR (™) PX 114; an anhydride-grafted polyolefin in ethylene/vinyl acetate having a melt index of 2.0 g/min. (ASTM D-1238); obtained from Quantum Chemicals of Cincinnati, Ohio.

18. "TIE-3": ADMER (™) SF700A; an anhydride-grafted polyolefin blend having a melt index of 1.0 g/min. (ASTM D-1238); obtained from Mitsui Petrochemicals of New York, N.Y.

Example 1

A multilayer film in accordance with the present invention had the following seven-layer structure:

Layer 1 (heat-seal): 98% ION1+2% slip agent (20% of total thickness of layers 1–5)

Layer 2: TIE-1(16% of total thickness of layers 1–5)

Layer 3 (heat-resistant): EVOH (8% of total thickness of layers 1–5)

Layer 4: TIE-1 (16% of total thickness of layers 1–5)

Layer 5 (color-carrying): 73% HDPE+27% CC-PE (40% of total thickness of layers 1–5)

Layer 6: ADH

Layer 7 (heat-resistant): PET-1

The film was prepared by first coextruding layers 1 through 5 as a blown 5 layer film having a thickness of about 2 mils. Layer 7 was then laminated to layer 5 via adhesive layer 6.

Comparative Example 1

A multilayer film in accordance with the present invention had the following five-layer structure:

Layer 1 (heat-seal): 94% EAO2+6% slip agent (15% of total thickness of layers 1–3)

Layer 2: EAO2 (15% of total thickness of layers 1–3)

Layer 3: 70% HDPE+30% CC-PE (70% of total thickness of layers 1–3)

Layer 4: ADH

Layer 5 (heat-resistant: PET-2

The film was prepared by first coextruding layers 1 through 3 as a blown 3 layer film having a thickness of about 2 mils. Layer 5 was then laminated to layer 3 via adhesive layer 4.

Comparative Example 2

A multilayer film in accordance with the present invention had the following nine-layer structure:

Layer 1 (heat-seal): 98% ION1+2% slip agent (20% of total thickness of layers 1–7).

Layer 2: EAO-1 (8% of total thickness of layer 1–7)

Layer 3: TIE-1 (8% of total thickness of layers 1–7)

Layer 4: EVOH (8% of total thickness of layers 1–7).

Layer 5: TIE-1 (8% of total thickness of layers 1–7).

Layer 6: EAO-1 (8% of total thickness of layer 1–7)

Layer 7: 73% LDPE+27% CC-PE (40% of total thickness of layers 1–7).

Layer 8: ADH

Layer 9 (heat-resistant): PET-1

The film was prepared by first coextruding layers 1 through 7 as a blown 7 layer film having a thickness of about 2 mils. Layer 9 was then laminated to layer 7 via adhesive layer 8.

Comparative Example 3

A coextruded and laminated multilayer film had the following nine-layer structure:

Layer 1 (heat-seal): 98% ION2+2% slip agent (30% of total thickness of layers 1–7)

Layer 2: TIE-1 (8% of total thickness of layers 1–7)

Layer 3: 90% N6+10% CC-N (8% of total thickness of layers 1–7)

Layer 4: EVOH (10% of total thickness of layers 1–7)

Layer 5: 90% N6+10% CC-N (7% of total thickness of layers 1–7)

Layer 6: TIE-1 (7% of total thickness of layers 1–7)

Layer 7: 20% TIE-3+55% PP+25% CC-PP (30% of total thickness of layers 1–7)

Layer 8: ADH

Layer 9: (heat-resistant): PET-1

The film was prepared by first coextruding layers 1 through 7 as a blown 7 layer film having a thickness of about 2 mils. Layer 9 was then laminated to layer 7 via adhesive layer 8.

Example 2

The films described in Example 1 and Comparative Examples 1–3 were used as the non-forming (top) webs on a Multivac R2000 (™) packaging machine to form packages. A forming (bottom) web was thermoformed by the packaging machine into a pocket for inserting food products, and then peripherally heat-sealed to the non-forming web (i.e., one of the films of the foregoing examples) to enclose and complete the package.

The forming web had the following film structure:

PP/tie/N6/EVOH/N6/tie/ionomer or LLDPE (heat-seal)

An ionomer heat-seal layer in the forming web was used when heat-sealed to the films of Example 1 and Comparative Examples 2 and 3 (which also employ an ionomer heat-seal layer) while LLDPE was used as the heat-seal layer when heat-sealed to the film of Comparative Example 1.

The films (non-forming webs) of Example 1 and Comparative Examples 1–3 were observed for their ability to withstand both hydraulic redistribution of the white colorant in each film and heat-distortion at seal-head operating temperatures ranging from 120° C. to 180° C. and at an operating pressure of 72 psi. The ability of the films to withstand high packaging equipment heat-seal temperatures is highly desirable since high temperatures are often used to overcome heat-seal equipment deficiencies such as worn seal gaskets, inadequately calibrated seal head temperature controllers, non-uniform sealing pressures, and also to seal through food contamination in the heat-seal area which is prevalent in food packaging applications.

Table 1 provides a summary of the maximum Multivac R2000 (™) seal-head temperature attainable before visible quality defects were observed for the films of Example 1 and Comparative Examples 1–3.

TABLE 1

| FILM | MAXIMUM TEMP. (°C.) | DEFECT OBSERVED |
| --- | --- | --- |
| Example 1 | 175 | None |
| Comparative Example 1 | 125 | At 130° C., hydraulic redistribution was observed |
| Comparative Example 2 | 135 | At 140° C., hydraulic redistribution was observed. Heat-distortion was evident at all temperatures. |
| Comparative Example 3 | 175 | None |

The film from Example 1 maintained its integrity during packaging trials with seal-head temperature of up to 175° C. At a seal-head temperature of 178° C., the heat-seal layer of the thermoformed web began to melt and fray on the equipment and prevented further valid observation of film defects. The film from Comparative Example 3 performed similarly during heat-sealing, yet contains more costly components (e.g., nylon and polypropylene) than the film of Example 1, is a more complicated structure than the film in Example 1 since three more resin types and two more film layers are required to obtain similar results, and is more difficult to process than the film of Example 1 largely due to the use of polypropylene as a color-carrying, outer coextrusion layer (layer 7). Thus, the film in Example 1 provides the same performance as the film in Example 4 while decreasing cost, improving processing of the film, reducing the number of components required, and reducing the number of layers required.

The film in Comparative Example 1 maintained its integrity up to a heat-seal temperature of 125° C. Heat-distortion was not observed at any temperature but hydraulic redistribution was noted at 130° C. and above. The film in Comparative Example 1 demonstrates that the use of HDPE (or other such material having a vicat softening point ranging from 100° C. to 140° C.) as a color-carrying polymer does not provide sufficient temperature resistance to prevent hydraulic redistribution without also including a layer comprising a material having a melting point of at least 135° C. positioned between the color-carring layer and the heat-seal layer as an interior, heat-resistant layer.

The film in Comparative Example 2 maintained its integrity up to heat-seal temperatures of 135° C., although some heat-distortion was observed at all temperatures. This example demonstrates that the use of EVOH (or other such material having a melting point of at least 135° C.) as an internal heat-resistant layer and PET (or other such material having a melting point of at least 145° C.) as an external heat-resistant layer does not protect LDPE (or other color-carrying polymer having a vicat softening point of less than 100° C.) from hydraulic redistribution.

While the invention has been described with reference to illustrative examples, those skilled in the art will understand that various modifications may be made to the invention as described without departing from the scope of the claims which follow.

What is claimed is:

1. A multilayer film, comprising:
   a. a first layer comprising a material having a melting point of at least 145° C.;
   b. a second layer comprising a colorant blended with a polymer having a vicat softening point ranging from 100° C. to 140° C.;
   c. a third layer comprising a material having a melting point of at least 135° C.; and
   d. a fourth layer comprising a material which is capable of forming a heat-seal,
   wherein, said second layer is positioned between said first and third layers and said fourth layer is an exterior layer.

2. The multilayer film of claim 1, wherein said first layer comprises at least one material selected from the group consisting of polyester, copolyester, polyamide, copolyamide, polypropylene, polymethylpentene, polycarbonate, ethylene/vinyl alcohol copolymer, and mixtures and copolymers of the foregoing materials.

3. The multilayer film of claim 1, wherein said third layer comprises at least one material selected from the group consisting of polyester, copolyester, polyamide, copolyamide, polypropylene, ethylene/vinyl alcohol copolymer, polymethylpentene, polycarbonate, and mixtures and copolymers of the foregoing materials.

4. The multilayer film of claim 1, wherein said second layer comprises at least one material selected from the group consisting of linear low density polyethylene, medium density polyethylene, high density polyethylene, polystyrene, and mixtures of the foregoing materials.

5. The multilayer film of claim 1, wherein said second layer comprises high density polyethylene.

6. The multilayer film of claim 1, wherein said fourth layer comprises at least one material selected from the group consisting of ionomer, ethylene/alpha-olefin copolymer, ethylene/vinyl acetate copolymer, ethylene/methyl acrylate copolymer, ethylene/propylene copolymer, polybutylene homopolymer or copolymer, and mixtures of the foregoing materials.

7. The multilayer film of claim 1, wherein:
   a. said first layer comprises a material having a melting point of at least 150° C.;
   b. said second layer comprises a polymer having a vicat softening point ranging from 105° C. to 135° C.; and
   c. said third layer comprises a material having a melting point of at least 140° C.

8. The multilayer film of claim 7, wherein:
   a. said first layer comprises a material having a melting point of at least 155° C.;
   b. said second layer comprises a polymer having a vicat softening point ranging from 110° C. to 135° C.; and
   c. said third layer comprises a material having a melting point of at least 145° C.

9. The multilayer film of claim 1, wherein said first layer is laminated to a coextruded film comprising said second, third, and fourth layers.

10. The multilayer film of claim 1, wherein the total amount of polymer having a melting point of at least 135° C. present in said multilayer film is no greater than 50 percent of the total thickness of said multilayer film.

11. A package made from the multilayer film of claim 1.

12. A method of making a package, comprising:
   a. providing a first, multilayer film comprising:
      1) a first layer comprising at least one material having a melting point of at least 145° C.,
      2) a second layer comprising a colorant blended with a polymer having a vicat softening point ranging from 100° C. to 140° C.,
      3) a third layer comprising at least one material having a melting point of at least 135° C., and
      4) a fourth layer comprising a material which is capable of forming a heat-seal,
      wherein, said second layer is positioned between said first and third layers and said fourth layer is an exterior layer; and
   b. heat-sealing said multilayer film upon itself or to another film to form an enclosed package for a product.

13. The method of claim 12, wherein said first layer of said multilayer film comprises at least one material selected from the group consisting of polyester, copolyester, polyamide, copolyamide, polypropylene, polymethylpentene, polycarbonate, ethylene/vinyl alcohol copolymer, and mixtures and copolymers of the foregoing materials.

14. The method of claim 12, wherein said third layer of said multilayer film comprises at least one material selected from the group consisting of polyester, copolyester, polyamide, copolyamide, polypropylene, ethylene/vinyl alcohol copolymer, polymethylpentene, polycarbonate, and mixtures and copolymers of the foregoing materials.

15. The method of claim 12, wherein said second layer of said multilayer film comprises at least one material selected from the group consisting of linear low density polyethylene, medium density polyethylene, high density polyethylene, polystyrene, and mixtures of the foregoing materials.

16. The method of claim 12, wherein said second layer of said multilayer film comprises high density polyethylene.

17. The method of claim 12, wherein said fourth layer of said multilayer film comprises at least one material selected from the group consisting of ionomer, ethylene/alpha-olefin copolymer, ethylene/vinyl acetate copolymer, ethylene/methyl acrylate copolymer, ethylene/propylene copolymer, polybutylene homopolymer or copolymer, and mixtures of the foregoing materials.

18. The method of claim 12, wherein:
   a. said first layer of said multilayer film comprises a material having a melting point of at least 150° C.;
   b. said second layer of said multilayer film comprises a polymer having a vicat softening point ranging from 105° C. to 135° C.; and
   c. said third layer of said multilayer film comprises a material having a melting point of at least 140° C.

19. The method of claim 18, wherein:
   a. said first layer of said multilayer film comprises a material having a melting point of at least 155° C.;
   b. said second layer of said multilayer film comprises a polymer having a vicat softening point ranging from 110° C. to 135° C.; and
   c. said third layer of said multilayer film comprises a material having a melting point of at least 145° C.

20. The method of claim 12, wherein said first layer of said multilayer film is laminated to a coextruded film comprising said second, third, and fourth layers.

21. The method of claim 12, wherein the total amount of polymer having a melting point of at least 135° C. present in said multilayer film is no greater than 50 percent of the total thickness of said multilayer film.

* * * * *